UNITED STATES PATENT OFFICE.

HANS EBELING, OF BIEBRICH, GERMANY, ASSIGNOR TO KALLE AND COMPANY, OF BIEBRICH, GERMANY, A FIRM.

BROWN SULFUR DYE AND PROCESS OF MAKING SAME.

SPECIFICATION forming part of Letters Patent No. 723,448, dated March 24, 1903.

Application filed January 8, 1902. Serial No. 88,905. (No specimens.)

*To all whom it may concern:*

Be it known that I, HANS EBELING, a subject of the King of Prussia, Emperor of Germany, and a resident of Biebrich, Germany, have invented certain new and useful Improvements in the Manufacture of a New Dye Containing Sulfur, of which the following is a specification.

I have discovered that the amido derivatives of metatoluylenediamin when melted with sulfur and sodium sulfid yield very valuable dyes, which dye cotton without a mordant permanent brown shades. An especially remarkable feature of these dyes is that the dyeing effected with them does not require any subsequent treatment and is distinguished by its being particularly fast against the action of light. In this respect the new dyes differ advantageously from the brown coloring-matters containing sulfur hitherto in the market. These new dyes have, further, the property of being capable of being diazotized on the fiber and developed with the usual developers—such as, for instance, beta-naphthol, metatoluylenediamin, or resorcinol.

In preparing the new dyes it is not necessary to introduce into the melt the ready-made isolated amido derivatives of the metatoluylenediamin, as the same result can be obtained by melting those azo dyes which are obtained by the combination of metatoluylenediamin with diazo compounds of readily-volatile amins. Such azo dyes are, for instance, anilin-azo metatoluylenediamin and anilin-disazo metatoluylenediamin. Nitro derivatives of metatoluylenediamin or polynitro derivatives of toluidin give in the sulfur melt dyes which are different from those hereinbefore described.

The following examples will serve to illustrate the manner in which this invention can be carried into practice:

Example 1: Eighty kilograms of sodium sulfid are dissolved in a little water and melted at from 110° to 120° centigrade with thirty kilograms of sulfur. While this melt is being well stirred, twenty-five kilograms of tri-amido-toluol ($CH_3NH_2NH_2NH_2$, 1, 2, 4, 5) are introduced into it, and the temperature is then raised gradually to from 200° to 220° centigrade and maintained until the melt has become dry.

Example 2: Eighty kilograms of sodium sulfid are dissolved in a little water and melted at from 110° to 120° centigrade with thirty kilograms of sulfur. While this melt is being well stirred, thirty kilograms of anilin-azo metatoluylenediamin are introduced into it, and the temperature is then raised gradually. The azo dye passes into the solution and a reaction takes place, which reaches its maximum at about 160° centigrade. The anilin then splits off and a dark and smooth melt is formed. The temperature is then raised slowly to from 200° to 220° centigrade and maintained until the melt has become dry.

Example 3: Into a solution of thirty kilograms of sulfur in eighty kilograms of sodium sulfid and a little water are introduced at a temperature of 100° to 110° centigrade thirty kilograms of the anilin-disazo-metatoluylenediamin dye. The temperature is raised gradually while the mixture is being constantly stirred. At about from 150° to 160° centigrade the greater part of the anilin has split off. After the main reaction is over the melt is heated further to from 200° to 210° centigrade and this temperature maintained until the melt has become dry.

The dyes obtained in accordance with the hereinbefore-described invention dye cotton red-brown and are distinguished by their being perfectly fast against the action of soap and light. They can be diazotized on the fiber and developed with beta-naphthol, metatoluylenediamin, or resorcinol. In this manner brown shades of various tones are obtained.

The dyes dissolve very readily in water, the solution being brown, and they dissolve in concentrated sulfuric acid, the solution being dull brown. They are practically insoluble in alcohol. The color of the aqueous solution is not altered by soda-lye. When acids are added to the aqueous solution, a thick brown precipitate is formed.

Having now particularly described and ascertained the nature of this invention and in what manner the same is to be performed, I declare that what I claim is—

1. The herein-described process of making substantive brown cotton-dyes containing sulfur which consists in melting amido derivatives of metatoluylenediamin with sulfur and sodium sulfid at a high temperature.

2. The herein-described process of making a substantive brown cotton-dye containing sulfur, which consists in melting sodium sulfid and sulfur at a temperature from 110° to 120° centigrade, introducing into this melt while being stirred amido derivatives of metatoluylenediamin and gradually raising the temperature of this melt to from 200° to 220° centigrade and maintaining this temperature until the melt has become dry.

3. As a new article of manufacture, the new substantive sulfur-containing dye resulting from melting amido derivatives of metatoluylenediamin with sulfur and sodium sulfid at a high temperature which dyes cotton red-brown, is fast against soap and light, can be diazotized on the fiber, is readily soluble in water and dissolves in concentrated sulfuric acid, is insoluble in alcohol, and precipitates as a thick brown mass when acid is added to an aqueous solution thereof.

In testimony whereof I have signed my name to this specification in the presence of two subscribing witnesses.

HANS EBELING.

Witnesses:
  JEAN GRUND,
  IGNAZ ROSENBERG.